United States Patent
Tan et al.

(10) Patent No.: US 8,547,530 B2
(45) Date of Patent: Oct. 1, 2013

(54) SYSTEM AND METHOD TO DETECT FOREIGN OBJECTS ON A SURFACE

(75) Inventors: Ee Chong Tan, Singapore (SG); Weng Wah Khong, Singapore (SG); Kok Yi Wee, Singapore (SG); Shaw Rong Chong, Singapore (SG)

(73) Assignee: Cyclet Electrical Engineering Pte. Ltd., Singapore (SG)

( * ) Notice: Subject to any disclaimer, the term of this patent is extended or adjusted under 35 U.S.C. 154(b) by 1070 days.

(21) Appl. No.: 12/374,427

(22) PCT Filed: Jul. 12, 2007

(86) PCT No.: PCT/SG2007/000211
§ 371 (c)(1), (2), (4) Date: Aug. 21, 2009

(87) PCT Pub. No.: WO2008/010772
PCT Pub. Date: Jan. 24, 2008

(65) Prior Publication Data
US 2009/0323046 A1    Dec. 31, 2009

(30) Foreign Application Priority Data
Jul. 20, 2006    (SG) ............................... 200604901-9

(51) Int. Cl.
*G01C 3/08* (2006.01)

(52) U.S. Cl.
USPC ............ 356/4.01; 356/4.1; 356/5.01; 356/5.1

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | | |
|---|---|---|---|---|
| 6,327,536 B1 * | 12/2001 | Tsuji et al. | ..................... | 701/301 |
| 2005/0134440 A1 * | 6/2005 | Breed | ........................... | 340/435 |

FOREIGN PATENT DOCUMENTS

| | | |
|---|---|---|
| GB | 2382708 A | 6/2003 |
| GB | 2403861 A | 1/2005 |
| JP | 2005275723 | 10/2005 |
| WO | 02101411 A2 | 12/2002 |

* cited by examiner

*Primary Examiner* — Luke Ratcliffe
(74) *Attorney, Agent, or Firm* — Volpe and Koenig, P.C.

(57) ABSTRACT

A detection system and method are disclosed for detecting a foreign object on a surface, such as an airport runway or a racetrack. The detection system includes a plurality of detectors mounted on the vehicle and capable of receiving light reflected from the object on the surface, and producing data that indicates the presence of said object as said vehicle moves along the surface; and a computer electrically coupled to each of the plurality of detectors, said computer being capable of processing said data and generating an alarm to alert an operator of said vehicle to a presence of said object. In low light conditions, the system may further include a plurality of light sources mounted on a vehicle and capable of illuminating at least one monitored area of the surface with light.

27 Claims, 9 Drawing Sheets

SYSTEM AND METHOD TO DETECT FOREIGN OBJECTS ON A SURFACE

FIELD OF INVENTION

The present invention relates to a foreign object detection system for detecting a foreign object on a travel surface, such as on an airport runway surface.

BACKGROUND

Foreign Object Deposits (FOD), such as debris from a burst tyre of an aircraft, are objects which should at all costs, not be allowed to lie on an airport runway. FOD present a potentially serious danger to the safety of aircraft during take-off and landing. For example, the Supersonic Air France Concorde Flight AF4590 crash in Paris on 25 Jul. 2000 was due to an FOD: a 16-inch piece of metal present on the runway surface. Such objects may come from passengers, airport staff, machinery or even wildlife.

Notwithstanding the potential damage to an aircraft, if a jet engine is damaged by the ingestion of FOD into the engine (i.e., during taxiing), the maintenance costs can easily exceed USD1 million. Even a relatively small FOD (i.e. less than 50 mm in diameter) may cause harm to engines and fuselages of aircraft.

Most airports have implemented runway maintenance programs for removing FOD according to international aviation standards (e.g., International Civil Aviation Organization Annex 14 regulations). The Federal Aviation Authority in the US recommends a minimum of two inspections and one runway sweep daily. Currently, a typical sweep involves a runway being swept once daily by two runway sweeper vehicles operating at 25~35 km/h. Each runway sweeper vehicle has a driver and an inspector onboard. Sweeping is performed by a magnetic bumper in combination with a central brush and suction.

The typical manual sweeping practice is repetitive in nature because the manual sweeping practice relies only on human visual inspection together with a sweeper vehicle for sweeping a found FOD, which is time consuming as well as expensive. For example, it takes 1.5 hours and two sweepers with one human inspector on each sweeper to scrutinise a 50 meter wide 4 km long runway. Inevitably, poor lighting, weather changes and human fatigue compromise the effectiveness of sweeping. Furthermore, known sweeping processes lack verification of sweeping effectiveness because no immediate post-sweeping inspection takes place. If a heavy, non-ferrous foreign object which cannot be picked up by the magnetic bumper or is too heavy to be sucked up by a vacuum (e.g., an aluminium part) is left on the runway after sweeping, it may pose a grave danger to aircraft using the runway. Hence, automatic systems have been proposed for monitoring, alerting or picking up FOD on airport runways.

One known system proposes distributing a large number of automated robotic vehicles besides each runway to monitor and pick up FOD on a continuous basis. These robotic vehicles are less than 900 mm in height and each of them is constrained to work within a predetermined area by a network of rails. There are some major problems associated with this robotic system. Firstly, the system requires a large number of robotic vehicles to be positioned beside each runway. Secondly, data transmission and processing between the vehicles and the airport control tower further overloads airport staff and equipment. Thirdly, the system requires the robots to be located adjacent to the runway, which is generally undesirable as the runway and its immediate surroundings should be kept clear. Fourthly, the cost for implementing and maintaining the large number of robotic vehicles for an airport is expected to be prohibitive.

There is a need to provide a detection system or vehicle that overcomes, or at least ameliorates, one or more of the disadvantages described above.

SUMMARY

According to one aspect of the present invention, there is provided a foreign object detection system comprising: a plurality of detectors mounted on a vehicle and capable of receiving light reflected from an object on a surface, and producing data that indicates the presence of said object as said vehicle moves along the surface; and a computer electrically coupled to the plurality of detectors, said computer being capable of processing said data and generating an alarm to alert an operator of said vehicle to a presence of said object.

The detection system may further comprise a plurality of light sources mounted on the vehicle and capable of illuminating at least one monitored area of the surface with light, said plurality of light sources capable of being electrically coupled to said computer.

The processed data may comprise at least one attribute selected from a group consisting of an image of said object, a location of said object, a time that said data was collected, a material texture of said object and a size of said object.

The computer may further comprise at least one visual display screen and at least one speaker located within said vehicle, wherein said processed data is used to generate at least one of an audio alarm through said speaker and a visual alarm on said display screen to indicate the presence of said object to the operator of said vehicle.

The detection system may further comprise a global positioning system electrically coupled to said computer, said global positioning system capable of providing a position of said vehicle on said surface, and said location, to said operator, using said visual display screen.

The detection system may further comprise a recording system to record said processed data and a position of said vehicle, and wherein said computer further comprises: a database containing said processed data and a digital lookup table containing information concerning particular characteristics of known or scanned articles; and an image object detection module capable of comparing said processed data with said digital lookup table to determine the presence of said object.

The plurality of light sources may comprise 4 laser line generators mounted on a front of said vehicle and two xenon lights positioned on said vehicle to illuminate said monitored area. Each of the 4 laser line generators may further comprise a converging lens capable of focusing laser light in said monitored area. The converging lenses of said 4 laser line generators in combination may focus laser light in a linear band perpendicular to a direction of travel of said vehicle, said band being between 50 millimeters and 70 millimeters deep focused between 10 meters and 12 meters in front of said vehicle, within said monitored area. A wavelength of the light emitted from said laser line generators may be in a range of about 600 nm to about 900 nm.

The plurality of detectors may be selected from a group consisting of a photographic imager, a laser radar and a visible light sensor. The photographic imager may be selected from a group consisting of a line scan camera, a Charged-Coupled Device (CCD) camera, a Complementary Metal-Oxide Semiconductor (CMOS) camera and an infrared (IR) camera, and wherein said photographic imager further comprises at least one of a polarizer and a light filter.

The plurality of detectors may further comprise two photographic imagers and a snap-shot camera mounted on said vehicle, and wherein said processed data includes a stereo image of said object. The plurality of detectors may even further comprise two Ladars mounted on the front of said vehicle.

The computer may analyze the data received from each of said detectors, and generate said alarm when at least three of said detectors indicate the presence of said object.

The snap-shot camera may be activated by said computer when said global positioning system provides a signal to said computer indicating that said vehicle is within a stipulated distance from said object.

The light from said laser line generators may have a wavelength of 680 nm, wherein said computer may generate said alarm to indicate an aluminium object on said surface. The detection may further comprise a transmitter to transmit said alarm to a location remote from said vehicle.

The vehicle may further comprise a brush and a vacuum system for removing said object from said surface.

The plurality of light sources may further comprise a laser line generator mounted on a rear of the vehicle and at least one xenon light mounted on the rear of the vehicle. The plurality of detectors may further comprise a line scan camera mounted on the rear of the vehicle and a video camera mounted on the rear of the vehicle, wherein said computer may generate said alarm if the vehicle passes said object.

The surface may be one of an airport runway, a highway, a railroad track, and a racetrack. The vehicle may be operated at a speed of at least 20 kilometers per hour. The monitored area may be at least one of a first area in front of said vehicle and a second area behind said vehicle.

Another aspect of the present invention provides a method of detecting a foreign object on a surface, the method comprising the steps of: providing a system comprising a plurality of detectors mounted on a vehicle and capable of receiving light reflected from an object on the surface, and of producing data that indicates the presence of said object as said vehicle moves along the surface, and a computer electrically coupled to each of the plurality of detectors; driving said vehicle along said surface; and using the computer to process the data from the plurality of detectors to detect the object and to generate an alarm to indicate a presence of said object to an operator of said vehicle.

The system may further comprise a plurality of light sources mounted on the vehicle and capable of illuminating at least one monitored area of the surface with light, said plurality of fight sources being electrically coupled to said computer, and the method may further comprise the step of illuminating the monitored area during low light conditions prior to said using step.

The plurality of light sources may further comprise 4 laser line generators mounted on a front of the vehicle and at least one xenon light positioned on the vehicle to illuminate the monitored area, the plurality of detectors may comprise two line scan cameras mounted on the vehicle, the computer may further comprise at least one speaker and at least one display device for communicating said alarm to said driver, a recording system to record said processed data, a database containing said processed data, a digital lookup table containing information concerning particular characteristics of known or scanned articles, and an image object detection module capable of comparing said processed data with said digital lookup table to determine a presence of said object. The using step may then further comprise receiving and processing a data signal from each of the line scan cameras; comparing the processed data with the digital lookup table using the image object detection module to determine the presence of the object, and generating said alarm using at least one of said speaker and said display device.

Each of the 4 laser line generators may further comprise a converging lens capable of focusing laser light in the monitored area; wherein said illuminating step may further comprise focusing the laser light in a linear band perpendicular to a direction of travel of the vehicle, the band being between 50 millimeters and 70 millimeters deep focused between 10 meters and 12 meters in front of the vehicle, within the monitored area.

The detectors may further comprise two Ladars mounted on the front of the vehicle, wherein said using step may further comprise generating the alarm if the object is detected by at least three of the detectors. The system may further comprise a transmitter to transmit the alarm to a location remote from the vehicle. The light from the laser line generators may have a wavelength of 680 nm, wherein the comparing step may further comprise determining if the object comprises aluminium, and said generating step may further comprise sending the alarm to the remote location.

In the method, prior to the driving step, the method may further comprise defining a plurality of sweeping zones on the surface. The driving step may further comprise driving along each of the plurality of sweeping zones. The sweeping zones may be narrower than a width of the monitored area. The method may further comprise a step for removing the detected foreign object from the monitored area.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Definitions

The following words and terms used herein shall have the meaning indicated:

The terms "foreign object", "Foreign Object Deposits", "FOD" and grammatical variations thereof, in the context of this disclosure, are to be interpreted broadly to include any object that is normally not a part of a travel surface, such as an aircraft runway, and which may hinder or be potentially dangerous to the use of the travel surface. For example, FOD or foreign objects which are to be avoided on taxiways, runways, maintenance shops, airport ramps and skyways, include wire clippings, tools, luggage parts, crumbling concrete, construction debris, birds, etc.

The term "structured light" means light which is projected in a predetermined geometric pattern and may include both coherent (laser) and non-coherent light. In one embodiment, the structured light consists of a longitudinal line emitted onto a monitored surface formed by a laser beam. Other structured light configurations are also usable.

Unless specified otherwise, the terms "comprising" and "comprise", and grammatical variants thereof, are intended to represent "open" or "inclusive" language such that they include recited elements but also permit inclusion of additional, un-recited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Description

Embodiments of the present invention provide a system and method for detecting and removing FOD on a surface, such as an airport runway, a racetrack, or any other surface where the presence of foreign objects may be undesirable. Embodiments of the system use a plurality of light sources and detectors mounted on a vehicle and controlled by a computer, to provide foreign object detection and removal. The light sources can include, by way of example and not limitation, standard lighting as well as laser light generators. Ambient light, i.e. daylight, can also be used to illuminate the surface. The detectors can include, again by way of example and not limitation, one or more photographic imagers, a Ladar (laser radar), a visible light sensor, a synthetic-aperture sensor radar, a radio meter, a radar transceiver, a multi-static radar transceiver, and an ultrasonic detector. Some examples of the photographic imagers can include a Charged-Coupled Device (CCD) camera, a Complementary Metal-Oxide Semiconductor (CMOS) camera and an infrared (IR) camera. Other types of cameras can also be used.

Figure 1:
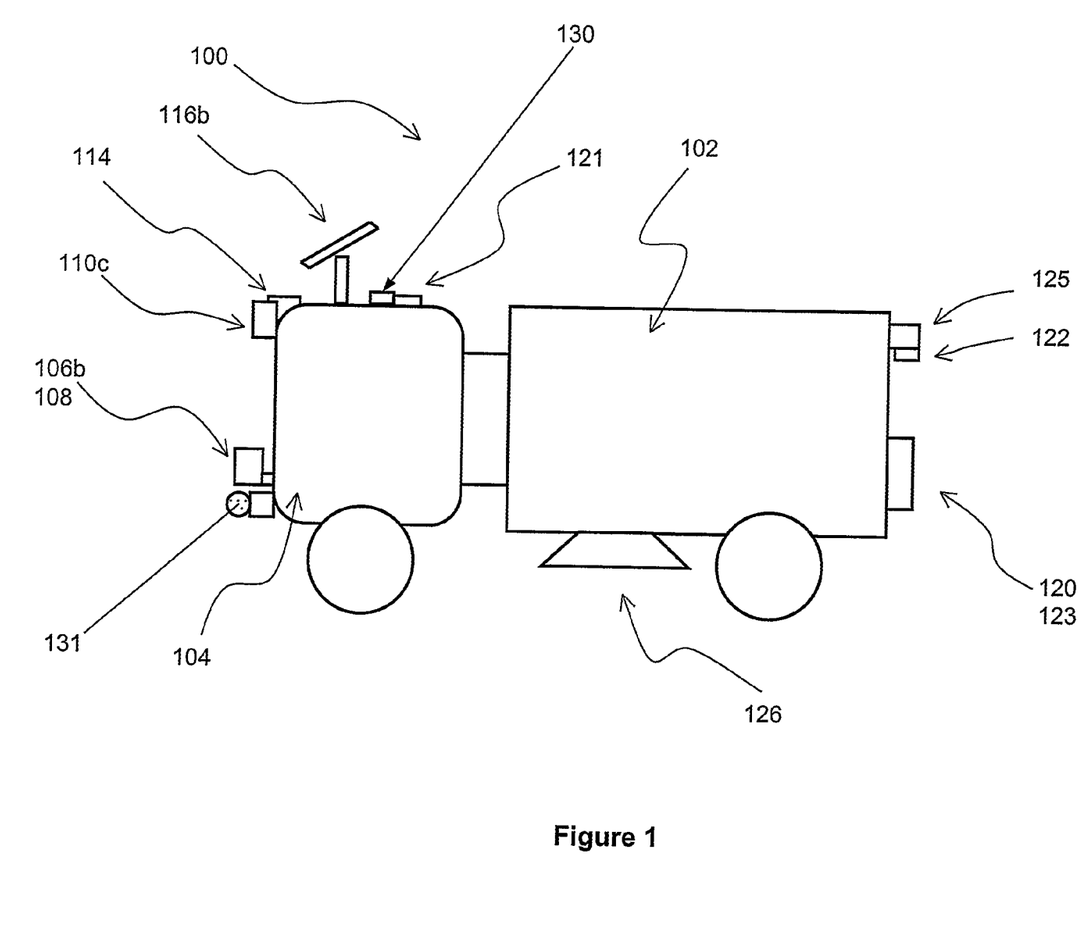
FIG. 1 is a side view of one embodiment of a foreign object detection system in accordance with the present invention.

FIG. 1 illustrates a side view of one embodiment of a foreign object detection system 100 in accordance with the present invention. While the following discussion addresses one embodiment of the invention in which the surface is an airport runway, it is understood that the surface can be any surface where the detection of foreign objects may be desirable, such as a race track, highways, or railroad tracks.

The system 100 includes a vehicle in the form of sweeper vehicle 102. The system 100 has a number of different types of detectors installed thereon for identifying foreign objects from the airport runway. The sweeper 102 can include sweeping means, illustrated generally by arrow 126, in the form of, by way of example and not limitation, a central brush and a suction housing. The brush sweeps FOD from the runway surface while a vacuum is applied to the suction housing to remove the FOD from the runway surface. The detection system 100 operates to sense the presence of foreign objects around the sweeper vehicle 102 and provide the position, nature or other properties of the detected foreign objects. Specific types and models of sweeper vehicles 102 that perform these functions are know to those of skill in the art.

Figure 2:
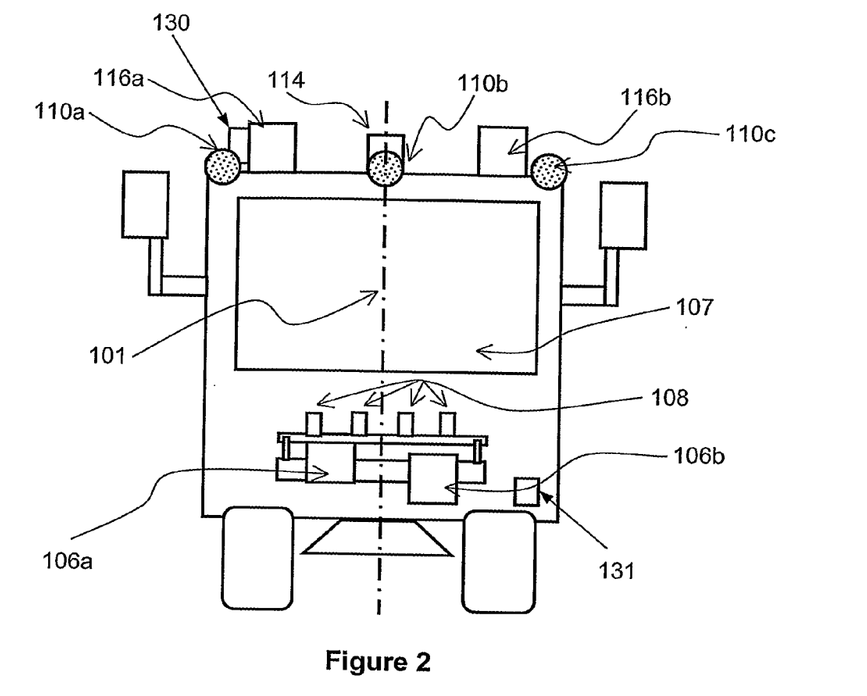
FIG. 2 is a front view of the system of FIG. 1.

Referring to both FIGS. 1 and 2, one or more laser line generators 108 can be located below the sweeper vehicle front windscreen 107. In the embodiment shown, four laser line generators 108 are used to illuminate the surface being swept during low light conditions. In one embodiment, the laser line generator 108 is a Sintec Optronics red diode laser module with a Model Number: ST-SL660-800. It is understood that other models or types of laser line generators 108 can also be used. It is further understood that, while this embodiment discusses the use of four laser line generators, fewer or more laser line generators can be used without departing from the scope of the present embodiment. Additionally, when ambient light conditions are good, the laser line generators 108 and xenon lights 110 can be switched off, and the surface illuminated with ambient light.

Two laser radars (Ladars) (106a, 106b) can be symmetrically mounted below the laser line generators 108 to emit laser light from the front of the vehicle 102. One or more xenon lights 110 can be mounted above the windscreen 107. In the embodiment shown, three xenon lights (110a, 110b, 110c) are mounted above the windscreen 107. It is understood that fewer or more xenon lights 110 can be used immediately behind the middle xenon light (110b), a snap-shot camera 114 can be mounted for monitoring a front ground of the sweeper vehicle 102. Additionally, two line scan cameras (116a, 116b) can be mounted above a driver's cabin 104 for sensing an area in front of the sweeper vehicle 102 using either ambient light or light from the laser line generators 108. In one embodiment, the line scan camera 116 can be a DALSA Model No. P2-2X-04K30. It is understood that other models or types of line scan cameras, and other mounting locations, can also be used.

A light sensor 130 can be located on top of the driver's cabin 104 for measuring the amount of ambient light available. A proximity sensor 131 can be located on the front of the vehicle 102 to provide an alarm to the driver if the vehicle approaches a person or large object on the surface. A global positioning system (GPS) device 121 can be installed on the top of the driver's cabin 104, for locating the sweeper vehicle's position, and for identifying a position of the FOD on the surface.

Figure 3:
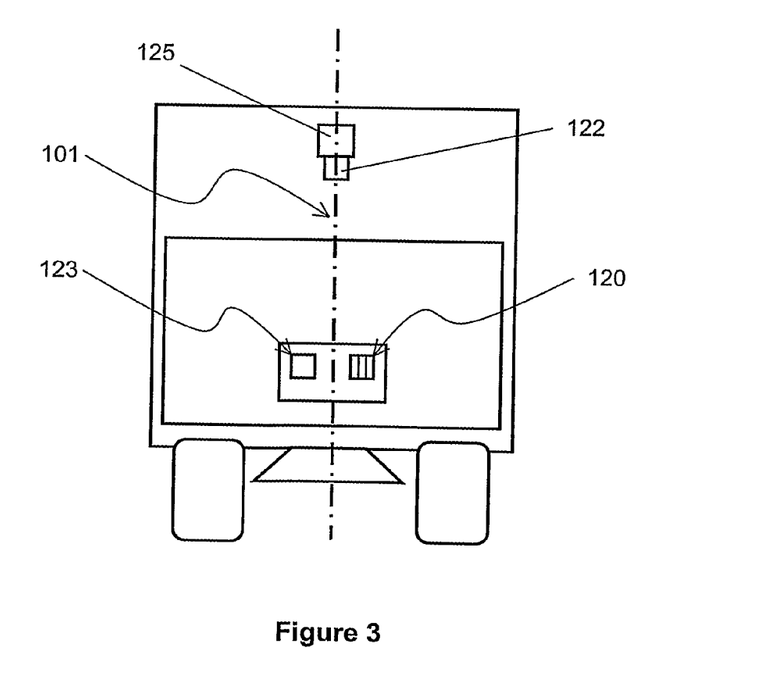
FIG. 3 is a rear view of the system of FIG. 1.

Referring now to both FIG. 1 and FIG. 3, a line scan camera 120 and a laser cine generator 123 can be located at the rear of the sweeper vehicle 102. A video camera 122 can be mounted to the rear of the sweeper vehicle 102 for inspecting a monitored area of the runway as will be described further below. Below the video camera 122, a xenon light 125 provides lighting for the area monitored by the video camera 122. It is understood that additional xenon lights 125 can be used.

Figure 4:
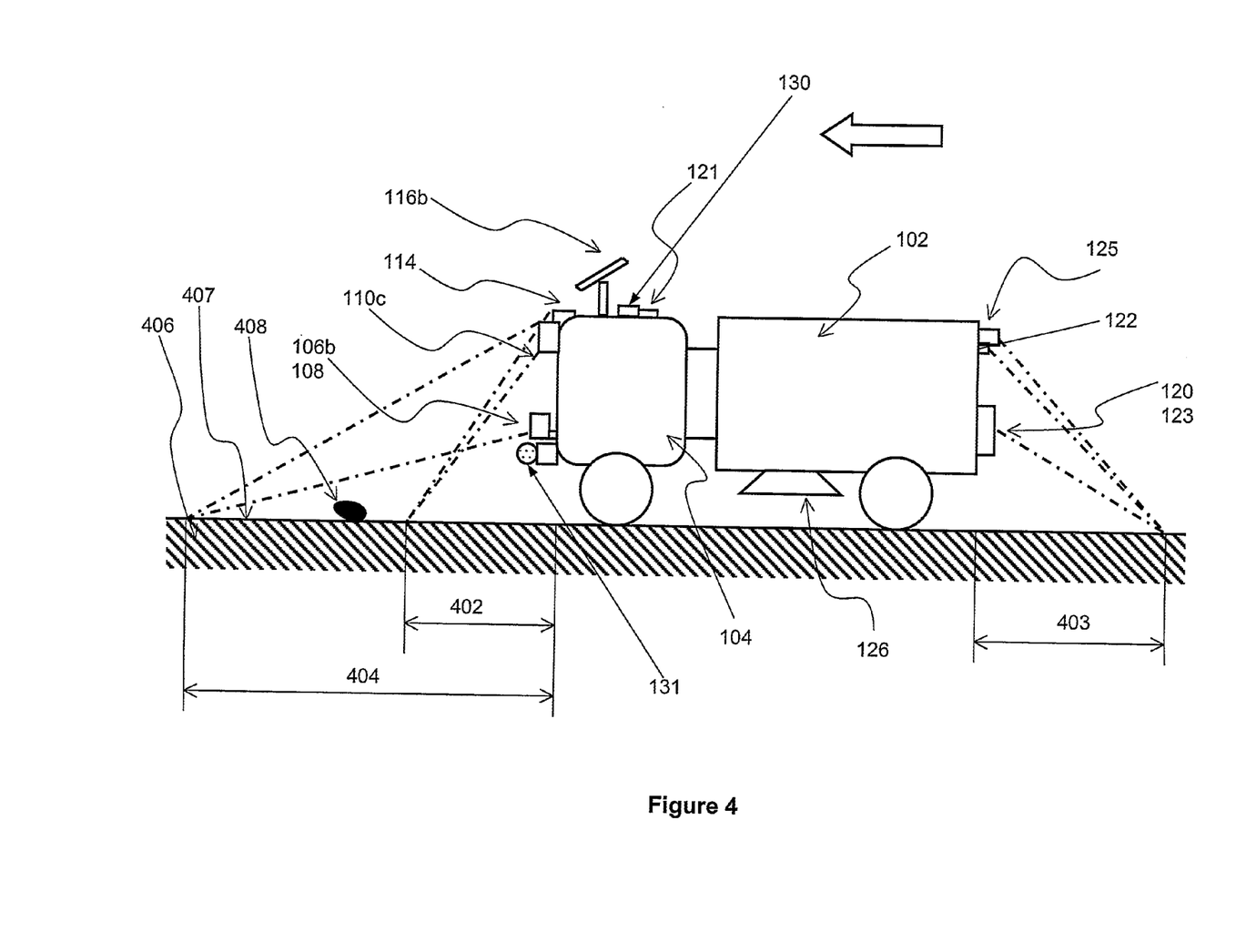
FIG. 4 is a side view of the system of FIG. 1 on a surface.
Figure 5:
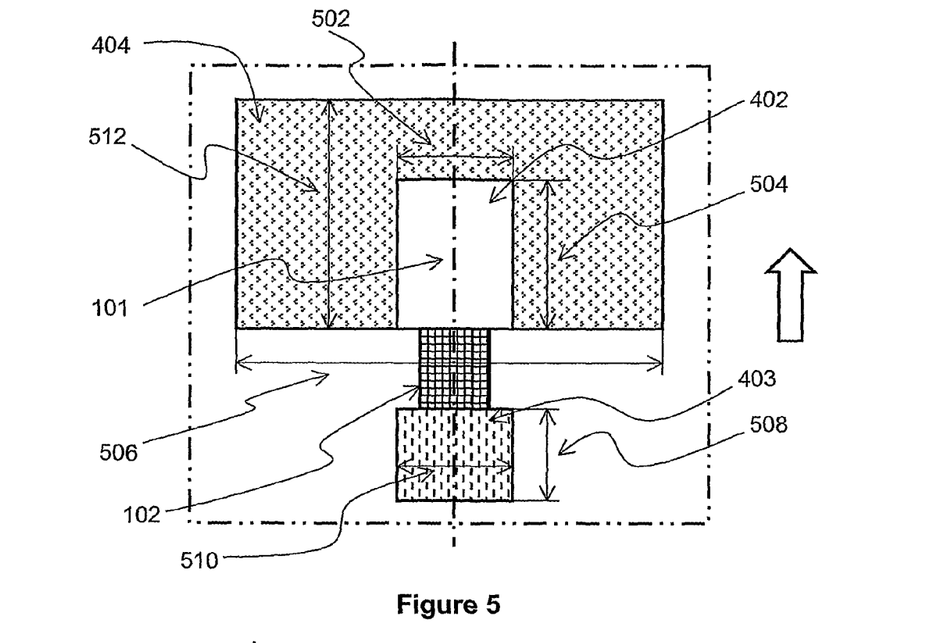
FIG. 5 is a top view of focus areas and photo taking areas for the system of FIG. 1.
Figure 6:
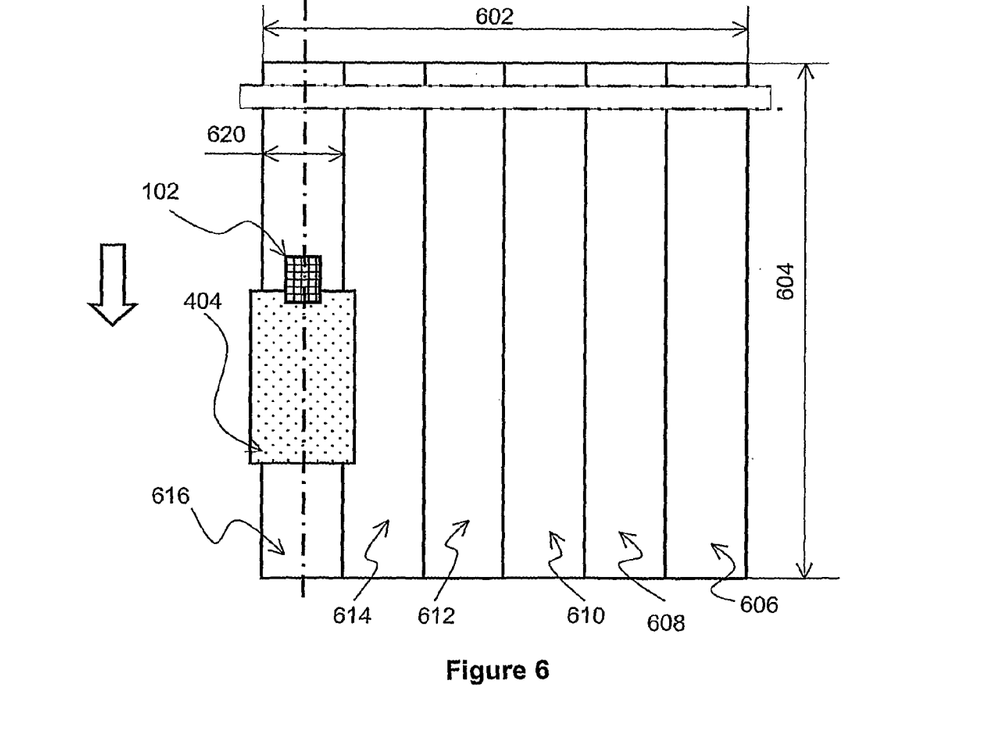
FIG. 6 is schematic diagram of defined sweeping zones of a runway.

Referring to FIGS. 4 and 5, there is shown the sweeper vehicle 102 travelling on a surface 407 of an airport runway 406. FIG. 5 shows a top view of monitored areas in the form of a front focus area 404 and a photo taking area 402 immediately ahead of the sweeper vehicle 102 and a rear focus area 403 directly to the rear of the sweeper vehicle 102. FIG. 6 is a schematic diagram of defined sweeping zones (606, 608, 610, 612, 614, 616) of the runway 406.

The focus areas (403, 404) and photo taking area 402 can be symmetrical with respect to the centre line 101 of the sweeper vehicle 102. All the focus areas (404, 403) are in immediate proximity either ahead of or behind the sweeper vehicle 102. In one embodiment, the front focus area 404 enclosing the photo taking area 402 has a width 506 of 12 meters and length 512 of 12 to 20 meters. Inside the front focus area 404, which is the prime focus area for detecting a foreign object 408, the photo taking area 402 is a rectangular-shaped area with a width 502 of three meters and length 504 of six meters. Behind the sweeper vehicle 102, the rear focus area 403 has a width 510 of three meters and length 508 of four meters.

Both focus areas (403, 404) are respectively illuminated by the laser line generators (108, 123). The front focus area 404 is illuminated by visible laser light from the four laser line generators 108. In one embodiment, the illumination can be in the form of continuous lines. Visible laser light reflected from the front focus area 404 on the airport runway surface 407 is captured by the line scan cameras 116. When ambient light conditions are good, i.e. daylight, ambient light reflected from the front focus area 404 on the airport runway surface 407 is captured by the line scan cameras 116. The image is then analysed by an onboard computer to detect foreign objects.

In one embodiment, in order to increase the resolution of the image captured by the line scan camera 116, and thereby enhance object detection, the wavelength of the laser is set between 635 nm to 660 nm. At this wavelength, the detection system 100 is able to find an object down to the size of 50 mm in diameter when the sweeper vehicle 102 travels at 30 km/h on the runway 406 using the images captured by the detectors (116, 120). It is further possible to sense an object only 10 mm in diameter on the runway 406 at a reduced driving speed of 20 km/h. The onboard computer processes the image data and detects the presence of an object due to any surface anomalies of the focus areas (403, 404) as indicated by the input image data. At a wavelength of about 660 nm, black objects (e.g., a rubber type marking on the runway 406) can be detected. At a wavelength of about 680 nm, it is possible to specifically discriminate aluminium objects on the surface 406.

Focus areas (404, 403) are aligned to the runway 406 for sweeping. Referring to FIG. 6, the airport runway 406 having a width 602 of 60 m, is divided and marked with zones of different colours for sweeping. In this embodiment, there are six zones (606 to 616) on the runway 406. They are coloured red 616, yellow 614, blue 612, orange 610, grey 608 and pink 606 sequentially. It is understood that these colours are provided by way of example only. Any distinguishing scheme can be used. In other words, a 60 meter wide runway 406 can be segmented into six identical stripes with a length 604 of 4,000 m and width 620 of 10 m each. The sweeper vehicle 102 travels along a centre line of each stripe during a routine trip for FOD detection in the front focus area 404.

Referring to FIG. 6, a second display screen (not shown) located within the cabin of the vehicle 102 displays the vehicle's position and guides the vehicle 102 back to the pre-defined position and direction for the sweeping operation. Sweeping zones (806, 608, 610, 612, 614, 616), which are indicative of a section of the runway, are displayed on the second display screen so that those parts that have been swept in a sweeping operation are displayed with a shade of white and those that have not are not shaded. It is understood that this shading scheme is provided by way of example only, and that different shading schemes can be used without departing from the scope of the embodiments. Hence, the computer system 700 provides a visual display of the runway 406 during the sweeping operation and continuously updates the runway sweeping condition.

Figure 7:
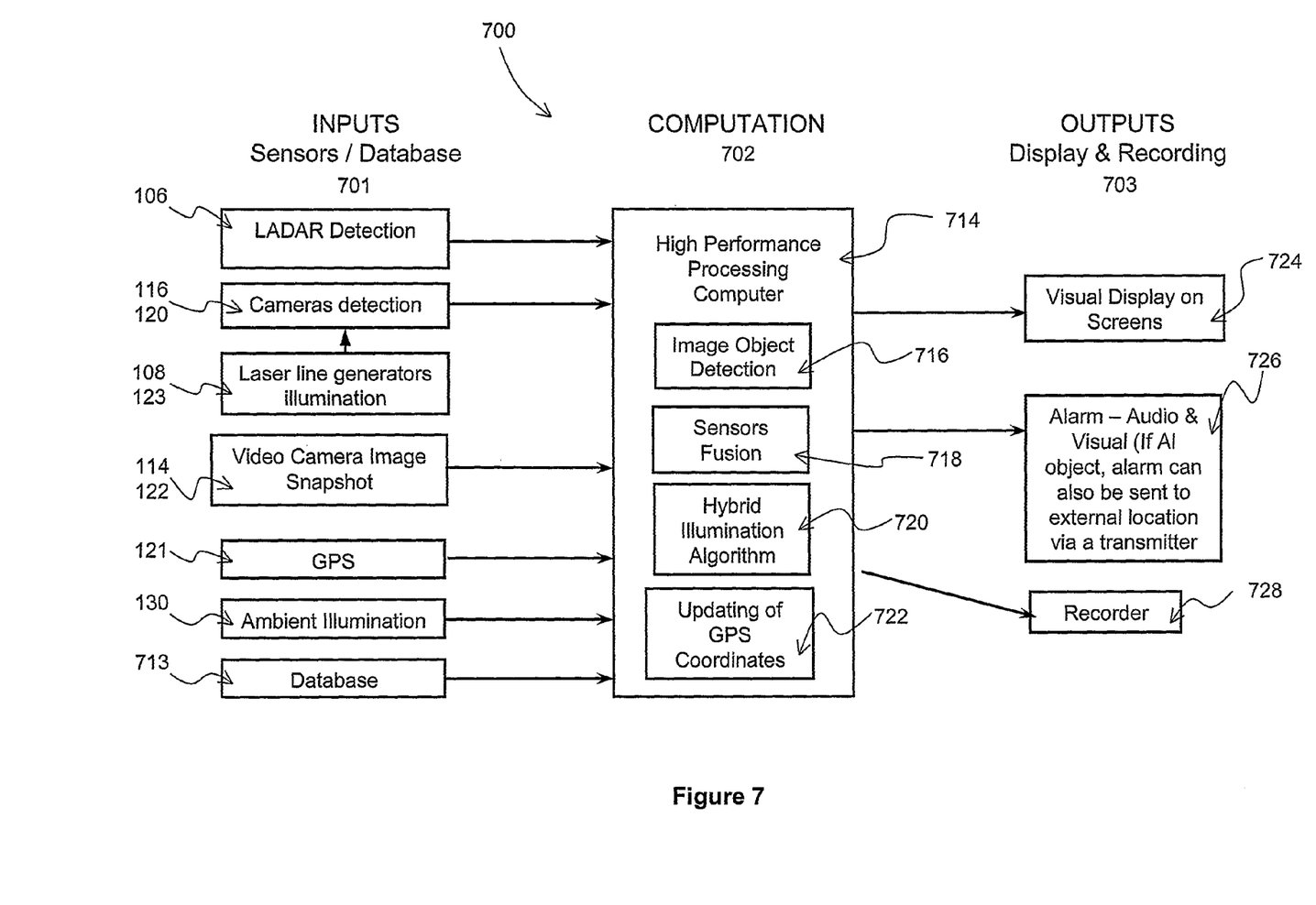
FIG. 7 is schematic diagram of a computerized detection system according to FIG. 1.

FIG. 7 illustrates a schematic diagram of a computerised detection system 700 used by the sweeper vehicle 102 of FIG. 1. The system 700 comprises a high performance processing computer 714, which is electrically coupled to the detectors (106, 116, 120), the illuminators or light sources (108, 110, 123, 125), the video cameras (114, 122), the GPS 121, the light meter 130, the displays 724, the audio-visual alarm 726 and the data recorder 728, for control thereof. Accordingly, the system 700 comprises three parts, namely the inputs 701, the computer (CPU) 702 and the outputs 703. The inputs 701 comprise signals received from the sweeper's onboard detectors (106, 116, 120), the light meter 130 and database 713. As shown in FIG. 7, the signals from the Ladars 106, the line scan cameras (116, 120), the snap-shot camera 114, the video camera 122, the GPS 121 and light meter 130 are electrically coupled to the computer 714. The light meter 130 detects the amount of ambient light and sends signals to the computer 714 so that the settings for the line scan cameras (116, 120) can be adjusted accordingly. The computer 714 also accesses past image data stored in the database 713 to help identify familiar FOD and eliminate false alarms by allowing the computer 714 to compare captured images with a database to determine the nature of the object. The system arrangement shown in FIG. 7 is provided by way of example only. It is understood that many other system arrangements can be used. For example, the database 713 and recorder 728 can reside within the high performance processing computer 714.

The high performance processing computer 714 employs processing modules for respective functions of the detection system 100. The processing modules can include an image object detection module 716, a sensors fusion module 718, a hybrid illumination algorithm module 720 and a GPS coordinate updating module 722. In some embodiments of the processing algorithm, both types of sensors' (e.g., Ladars 106 and cameras 116) results can be fused using the sensors fusion module 718.

The image object detection module 716 receives digital signals from the detectors (116, 120, 106) and converts the digital signals to analogue signals to detect the presence of an FOD and to display an FOD on a screen display system 724. The image object detection module 716 can also perform other functions. For example, the digital information can be fed to the sensors fusion module 718 for further processing. The module can also be used for calibration, so that the focus areas 402 of the line scan cameras (116a, 116b) and LADARs (106a, 106b) are coherent.

The sensors fusion module 718 provides an algorithm that checks the data received from the line scan cameras (116a, 116b) and the LADARs (106a, 106b) to confirm the presence of FOD. Upon confirmation of the presence of FOD, the sensors fusion module 718 can request and receive input from the GPS updating module 722. It can also send the information as an output to the LCD screen 724 and recorder 728. The sensors fusion module 718 can also provide a signal to enable the snapshot camera 114 to take still images of the FOD once the FOD is within the photo taking area 402. In some embodiments, the step of outputting the information and sending a signal to the camera 114 can be performed simultaneously.

The hybrid illumination algorithm module 720 constantly checks the output from the ambient light sensor 130 and adjusts the settings for the line scan cameras (116, 120) to suit different sunlight conditions. During the hours of normal daylight, the laser line generators 108 are not needed. As long as there is sufficient ambient light to engage the line scan cameras 116, 120, the laser line generators need not be employed. The hybrid illumination algorithm module 720 also checks the computer system time. Specific hours can be input into the computer system for daylight and night operations. For example, from 7 pm to 7 am the following day, the hybrid illumination algorithm module 720 could be set to ignore signals from the ambient light sensor 130 and to adjust the line scan cameras (116, 120) to night settings. At the same time, it would activate the laser line generators (108, 123). In alternate embodiments, when ambient light fades, the hybrid illumination algorithm module 720 can be set to provide a signal to engage the laser line generators 108. This is accomplished automatically, and requires no operator input.

The GPS coordinate updating module 722 receives and updates the current location of the GPS device 121. It can send the coordinates to the sensor fusion module 718 upon request. Additionally, the GPS coordinate updating module 722 can be used to constantly update the screen display system 724 with the current position of the sweeper.

At the output part 703, resultant outputs from the CPU 702 are displayed through the screen display system 724. The display system or computer 714 may include a speaker (not shown). The recorder 728 also stores the outputs from the CPU 702. Upon detection of a foreign object, an onboard audio-visual alarm 726 will operate (i.e., to beep together with visual flashes on the screen display system 724). The driver of the sweeper vehicle 102 can then decide whether to sweep and pick up the FOD manually. The recorder 728 is also used to generate reports associated with any detected POD.

In one embodiment, the screen display system 724 of the detection system 100 can include two screens, one screen showing the immediate surroundings of the sweeper vehicle 102 and the other showing the sweeper location relative to the whole monitored area (runway 406). Alternatively, a screen with two functional windows may be incorporated. The screen or window showing the immediate surroundings allows the driver to visualize where the foreign object is and move the sweeper vehicle 102 towards it to pick up an FOD. The screen or window showing the sweeper's location relative to the runway 406 allows the driver to know where the failed sweep and un-swept areas are at any time during a sweeping operation.

For the system 700 to operate, a digital map of an airport runway to be swept is provided. This is achieved by performing a site survey with the GPS system 121. The sweeping route is generated accordingly, and optimised by the computer system 700 so that the sweeper vehicle 102 can clean the defined zones 606 to 616 in an orderly manner (e.g., sequentially following the defined zones (606~616)) to ensure complete coverage, in this embodiment, each defined zone has a width 620 of 10 m, which is slightly less than the width 506 of the front focus area 404. Once a zone is swept, the zone can be shaded on the display 724 so that the driver is clearly informed of the zone being cleaned and remaining zones to be swept.

During operation, the sweeper vehicle 102 proceeds at, for example, 25 km/h along an airport runway 406 according to a scheduled route. Three xenon lights 110 light up the front focus area 404 and photo taking areas 402. This assists the sweeper driver in making a visual inspection and also provides sufficient light for the snap-shot camera 114. The onboard snap-shot camera 114 can be used to take still images of the photo taking area 402. Two Ladars 106 illuminate the front focus area 404 and also detect the reflected laser light therefrom.

At the same time, during the hours of darkness or low light conditions, the four laser line generators 108 project structured light illumination to the front focus area 404. The reflected laser light is picked up by the line scan cameras 116. During the hours of daylight, the laser line generators 108 and xenon lights 110 can be disengaged, and the line scan cameras 116 and snap-shot camera 114 operate using ambient light. Therefore, the line scan cameras 116 examine the same monitored area 404 as the Ladars 106. With two types of detectors focusing on the same scan area, a higher discrimination and improved foreign object identification accuracy can be achieved.

As explained above, the image data obtained by each detector (106, 116, 120) is sent to the computer 714, with the GPS device 121 connected to determine the coordinates of the vehicle 102 and any FOD at any point in time during a sweeping operation. With this arrangement, the detection system 100 can detect an object of 50 mm in diameter when travelling at 30 km/h.

As the vehicle 102 moves, scanned images from the line scan cameras 116 and Ladars 106 are stored into a recorder 728 of the computer 714. The scanned images can be further processed by the computer 714 using the sensors fusion module 718, wherein multiple images received from each individual image detector (106*a*, 106*b*, 116*a*, 116*b*) are merged into a single image. The location of the detected FOD is presented on the display 724 by Cartesian coordinates that indicate the position of the FOD on the runway 406 with respect to the vehicle 102. In other embodiments, the location of the FOD is presented by polar coordinates and the display format may be different to suit various users' requirements. In still other embodiments, the location of the FOD can be marked using the GPS system.

Having two Ladars (106*a*, 106*b*) for scanning the same area improves detection accuracy. In this embodiment, the field of view for each Ladar (106*a*, 106*b*) is an arc of thirty-eight degrees, which is equivalent to approximately twelve meters in width 506 at a distance up to twenty meters away from the sweeper vehicle 102. At this distance and angle, the ladars 106 operated by the computer 714 can detect an object as small as 50 mm in diameter. In one embodiment, the Ladar used is a SICK Ladar Model LMS 291. It is understood that other types of Ladars, with different operating characteristics and fields of view, could also be used.

When a foreign object is detected, an alarm in the form of, by way of example and not limitation, an audio-visual alarm 726, can be generated by the computer 714 in the cabin of the sweeper vehicle 102. This alarm informs the vehicle operator of the presence of the FOD on the runway 406. The sweeper vehicle 102 may have to deviate from its predetermined direction of sweeping in order to approach the detected FOD and thereby sweep it from the runway 406. The snap-shot camera 114 mounted on the sweeper vehicle 102 is capable of taking photographic images. The camera 114 is activated by the computer 714 as the GPS 121 informs the computer 714 that the sweeper vehicle 102 is within a stipulated distance from the FOD 408. The snap-shot camera 114 takes one or more photographic images of the FOD 408 before sweeping by the sweeper vehicle 102.

In some embodiments, the photographic images, together with the position of the FOD 408, are displayed on a first display screen (not shown) located within the cabin of the vehicle 102. The photographic images are stored in the recorder 728 for off-site processing. Hence, the recorded image data can be used for FOD statistical analysis to maintain a record of debris left on a runway. This may be useful in determining whether particular airlines or planes are responsible for the deposit of debris on a runway. This information can be useful in the event of a lawsuit being filed due to an aircraft accident or hazardous incident. Hence, the data may be used as future evidence for possible insurance claims if any lawsuit is filed against the airport operator. The data can also be used to determine the frequency of debris deposit and thereby alert the airport operator as to the optimal frequency that the runway should be swept with the vehicle 102.

In addition to detection of FODs by the Ladars (106a, 106b) and the line scan cameras 116, additional backup detection systems are also utilised. In this regard, FODs 408 can be detected visually by the operator of the vehicle 102 as the FOD is illuminated with xenon light 110. Consequently, a more reliable FOD detection is carried out regardless of ambient lighting conditions, which may be affected by weather changes (e.g., rain, snow, clouds, etc) or day-night shifts.

After sweeping, the system 100 performs a second check to determine if the FOD has been removed from the runway 406. At the back of the sweeper 102, the line scan camera 120 and visible laser illuminator 123 (laser line generator) focus within a fixed distance away from the back of the sweeper vehicle 102 to screen the rear focus area 403. The line scan camera 120 and laser illuminator 123 operate in the same manner as described above for the line scan cameras 116 and laser line generators 108. During good ambient light conditions, the line scan camera 120 can operate with using the laser line generator 123. Images of the rear focus area 403 are sent to the computer 714 to determine if an FOD is still present on the runway 406 or has been successfully swept off the runway 406. Again, the audio-visual alarm 726 is activated to alert the operator of the vehicle 102 if the object has not been swept from the runway 406. On hearing the alarm 726, the operator can activate the rear video camera 122, which is aided by the illumination of the rear xenon light 125, to confirm whether there is indeed a FOD present on the runway 408. If there is a FOD, it can be manually picked up by the operator of the vehicle 102. This is particularly useful where the FOE) is so heavy that it is not readily swept up by the vehicle 102.

The video camera 122 can also be switched on continuously to enable the driver to visually examine the rear focus area 403 throughout the sweeping operation. A further application of the video camera 122 is that it may aid the operator of the vehicle 102 when the vehicle 102 reverses.

There are times when the runway 406 is required for use by an aircraft to land or take off, and the vehicle 102 has to leave the runway 406 when it is in the middle of a sweeping operation. The vehicle 102 is able to record the departure position according to the GPS 121 informed coordinates and return to the departure position when the aircraft has finished using the runway.

Figure 8:
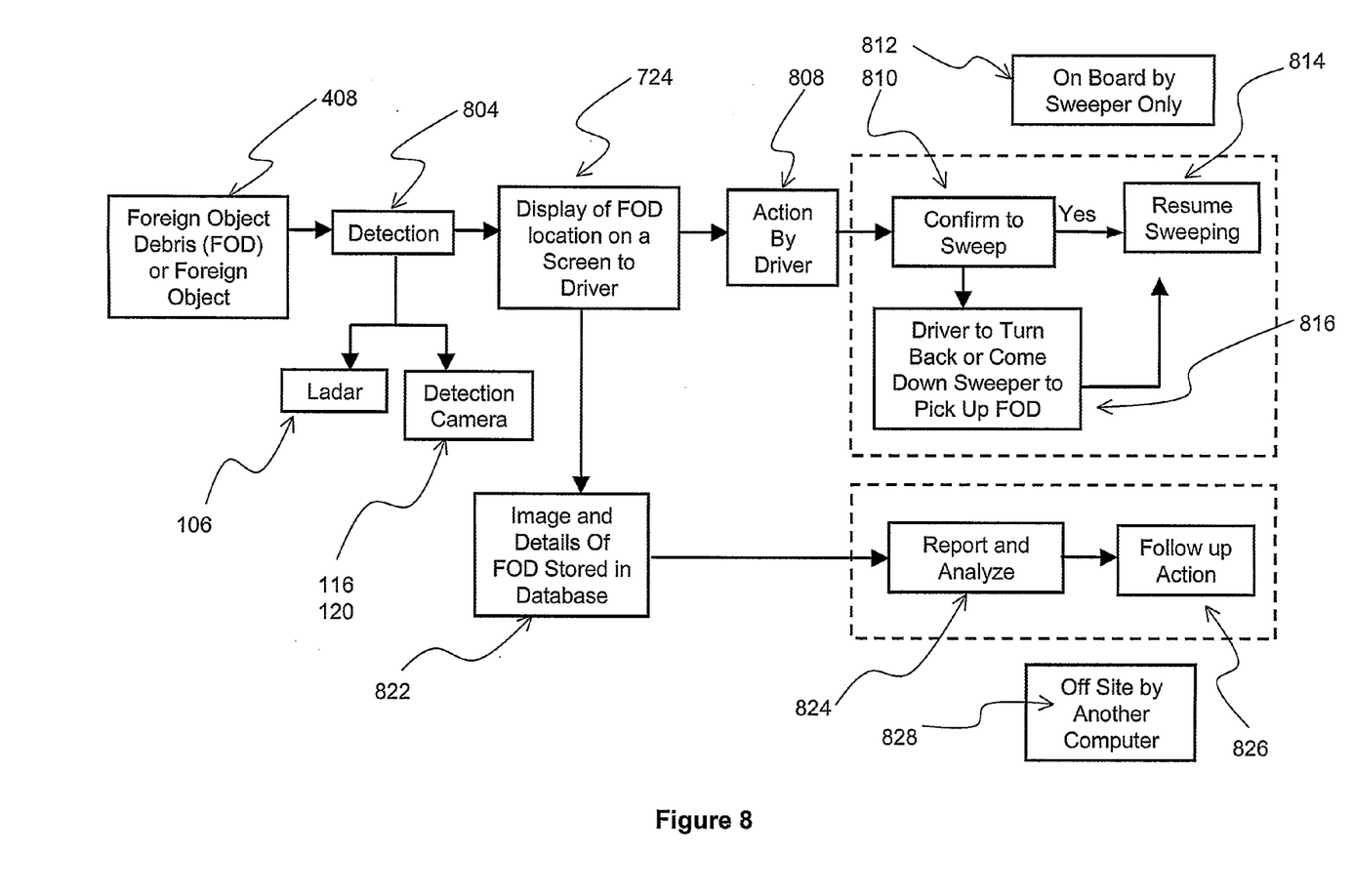
FIG. 8 is schematic diagram of the operation of the system of FIG. 1.

FIG. 8 illustrates one embodiment of a schematic diagram of the operation of the sweeper of FIG. 1, designated generally with reference numeral 800. The operation 800 is initiated by the detectors (106, 116, 120) detecting 804 FOD 408 on the runway surface 406. The detecting step 804 can include determining if the object is an aluminium object. The location of the detected FOD 408 is displayed 724 on the first display screen (not shown) for the operator of the sweeper vehicle 102. At the same time, images and details of the FOD 408 are stored 822 in a database 713 for reporting and analysis. The recorded data can include, by way of example and not limitation, an image, time, location, material texture and size of the detected FOD 408. The database 713 can be loaded onto a hard disk drive of the onboard computer 714 to be used for statistical analysis as described above. At the same time, the audio-visual alarm 726 is also set off when the FOD 408 is detected so that the driver of the sweeper vehicle 102 can look out and take action 808 either to sweep 810 the detected FOE) 408 or manually pick it up 816.

In some embodiments, the alarm can be generated not just at the vehicle, but, in the case of an aluminium object, at an external location, such as a maintenance hangar, using an external transmitter. In some embodiments, the operator can select a particular FOD 408 displayed on the display screen to bring up the recorded data available in the database 713 concerning the FOD 408. The report and analysis 824 together with follow up actions 826 (e.g. analysing locations where FOD is frequently detected, categorising types of FOD 408 detected, etc.) can be performed off-site 828. The driver resumes sweeping 814 after the FOD 408 is cleared off the runway 406.

Below are some examples of the techniques used for foreign object detection:

The laser radar (Ladar) can be, by way of example and not limitation, a pulsed time-of-flight radar system with a maximal range of about 50 m, a range resolution of about 50 mm, an angular resolution of about 0.5 degree, respondent time of about 40 ms, and a maximum pixel rate of about 13.9 kHz. The system provides a 180 degree horizontal field of view. Active fog correction can be built into the laser radar. Rain and snowfall interference can be cut out using pixel-oriented evaluation. The laser radars enclosure rating is IP65 and IP67, which make the Ladar capable of operating outdoors. The Ladar operates by measuring the time of flight of laser light pulses. The time between emission and reception of a light pulse, after it has been reflected from a surface, is directly proportional to the distance between the light source and the object. The pulsed laser beam can be deflected by a rotating internal mirror, to provide a scan of a wide area. The Ladar is safe, having laser protection class I. In some embodiments, the proximity sensor 131 can be used to shut down the laser pulses when an individual is detected close to the front of the system 100.

From the perspective of the detection system 100, the foreign object 408 moves around the detection system, while the detection system 100 is moving with respect to a monitored area (402, 404, 403). Thus the monitored areas (402, 404, 403) are regarded as time varying rather than static, and the environmental potential field is not only a function of position (x, y), but also of time t. The time-varying potential field algorithm is used to calculate the dynamic potential U(x, y, t) representing the environment around the detection system 100 as follows:

$$U(x, y, t) = \sum_{1}^{n} \left( \frac{k_1}{d_i} + \frac{k_2(\vec{V}_m + \vec{V}_i)\vec{d}_i}{d_i^2} \right) \quad (1)$$

where:

$V_m$ is the velocity of the mobile vehicle, $V_i$ is the velocity of detection system with respect to the foreign object, $d_i$ is the distance from the foreign object i to the detection system, n is the number of obstacles, $k_1$ and $k_2$ are assumed to be constant coefficients.

The left side and right side dynamic potentials of a detection system can be defined as:

$$\begin{cases} U_L(x, y, t) = \sum_{1}^{n/2} \left( \frac{k_1}{d_i} + \frac{k_2(\vec{V}_m + \vec{V}_i)\vec{d}_i}{d_i^2} \right) \\ U_R(x, y, t) = \sum_{n/2}^{n} \left( \frac{k_1}{d_i} + \frac{k_2(\vec{V}_m + \vec{V}_i)\vec{d}_i}{d_i^2} \right) \end{cases} \quad (2)$$

The purpose of having 2 laser radar units 106 is to use each of them to cross-check each other, so that false signals due to noise are eliminated. For any FOD present, both laser radar units 106 should give the same signal to the computer. Equation (2) can be used to process the data collected from each of the laser radar units 106 and compute the dynamic potentials of the left 106a and right 106b laser radar units. Subsequently, the sensors fusion algorithm 718 can be used to check the dynamic potentials of the left 106a and right 106b laser radar units for computational differences. For example, if the dynamic potential differences between both laser radar units were within +/−10% of each other, the computer would recognize the FOD. It is understood that other percentage differences can also be used.

In one embodiment, the line scan cameras 116, 120 can use a single 1024×1 photo-detector array that provides a single grey-scale (i.e., black-and-white) representation of a scanned foreign object at an image frame rate about 1000 Hz. The 1024×1 photo-detector array defines the 1024:1 ratio of the front focus area 402. Other arrays, colour scales, and frame rates can also be used.

Figure 9:
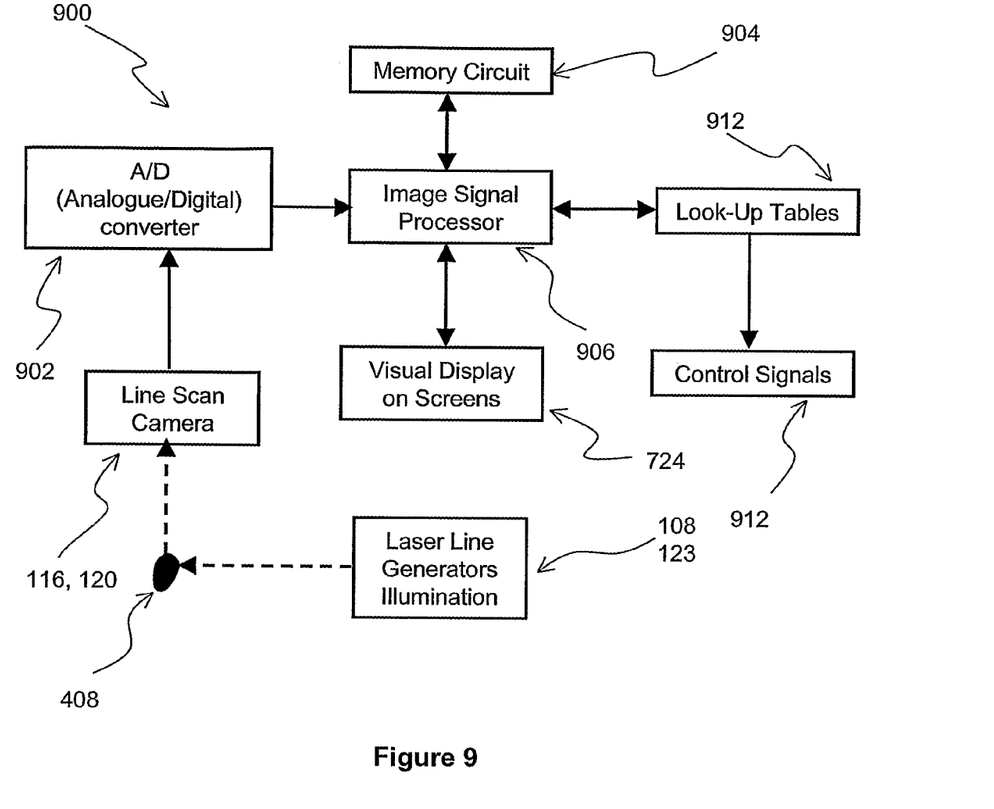
FIG. 9 is simplified block diagram of one method of processing data received from the detectors for the system of FIGS. 1 and 7.

One embodiment of a simplified block diagram of the data processing modules associated with the line scan cameras 116, 120 is shown in FIG. 9. The line scan cameras 116 receive images of the front focus area 402 and generate analogue signals of a detected foreign object 408 accordingly. The focus areas (402, 403) are illuminated by structured light from the laser line generators (108, 123). The analogue signals are converted to digital signals by the A/D converter 902 and are further processed by an image signal processor 906. In one embodiment, the A/D converter 902 is provided within the cameras (116, 120). Alternately, the ND converter 902 can be part of the computer system 714. A digital look-up table 912, configured as a random access memory circuit or a programmable logic array, stores information concerning particular characteristics (i.e., a drinking can as a foreign object) of known or scanned articles in accordance with the magnitudes of the video signals. As a result, control signals 726 (i.e. an audio-visual alarm) can be initiated as described above.

In some embodiments, the digital look-up table 912 can be configured to specifically ascertain whether or not the scanned article is made from aluminium. The presence of an aluminium article on the runway can be of particular significance, since it may be an indicator that the scanned article has come from an aircraft. When aluminium articles are identified, the control signals 726 can be initiated at both the operator console, and at a central location, such as the control tower or central maintenance facility, to alert airport staff of the potential hazard. In this case, aircraft that have recently traversed the area can then be alerted to a potential problem.

Figure 10A:
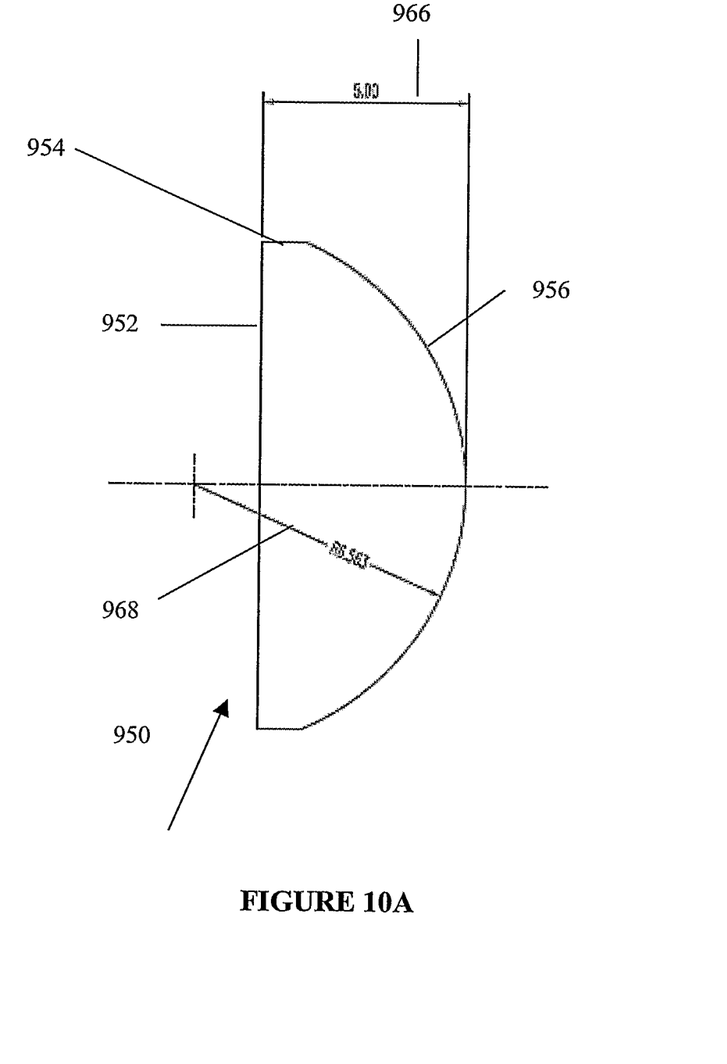
FIGS. 10*a* and 10*b* illustrate a top and side view, respectively, of one embodiment of a lens that can be used with the laser line generators shown in FIG. 2.
Figure 10B:
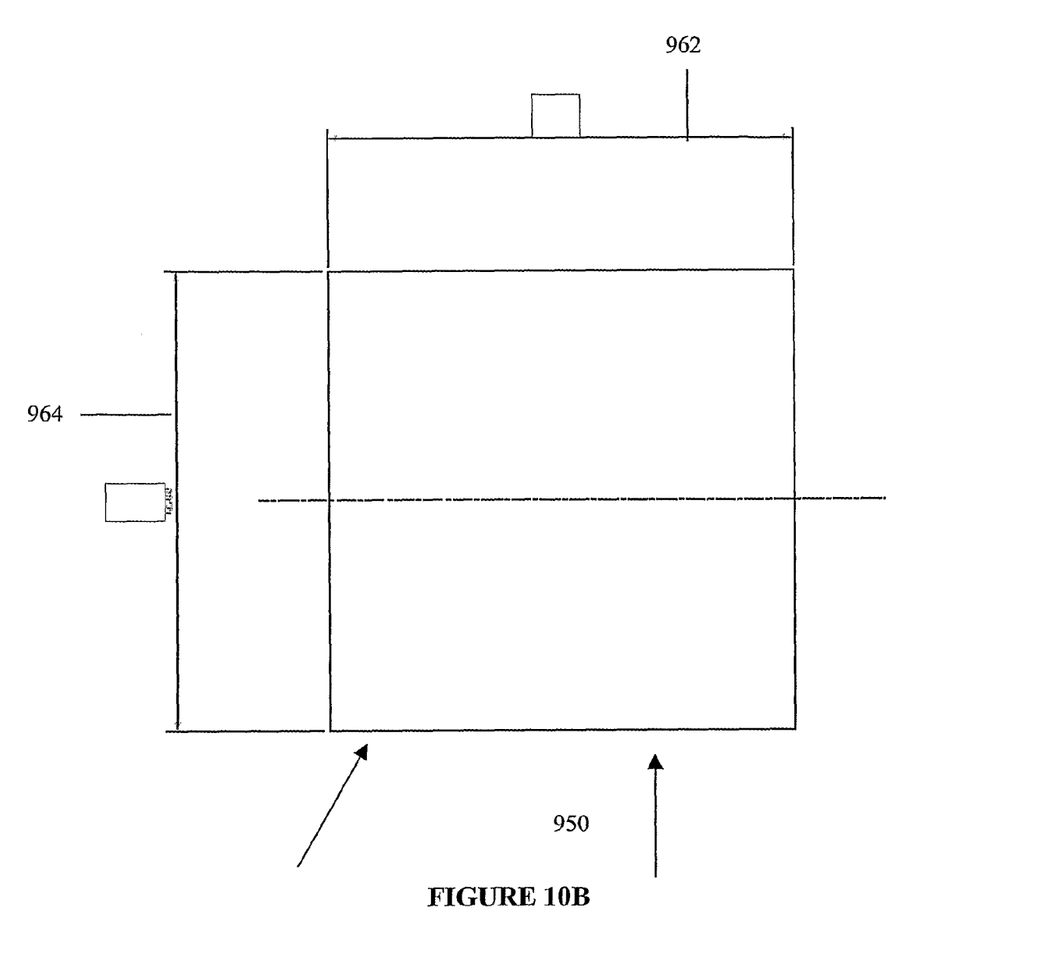

In some embodiments, the four laser line generators 108 can operate at a frequency of 650 nm. In some embodiments, each of the laser line generators 950 can be equipped with a convex lens 950, illustrated in FIGS. 10a and 10b. FIG. 108 illustrates a top view of the lens 950, while FIG. 10b illustrates a side view of the lens 950. In this embodiment, the lens 950 has a planar base 952, a side portion 954 perpendicular to the base 952, and a convex top surface 954. The lens 950 has a width 962, a length 964 and an overall height 966. In this embodiment, the convex top surface 954 has a uniform radius of curvature 958. In one embodiment, the width and length are 12 mm, the overall height is 5 mm, and the radius of curvature is 6.563 mm. These dimensions for the lens 950 allow the laser line generators 108 to focus the laser light in a linear band perpendicular to a direction of travel of the vehicle 102, and approximately 12 meters in front of the vehicle 102. Using the dimensions for the embodiment of the lens 950 given above, the linear band can be, by way of example and not limitation, about 12 meters wide (side to side) and about 50-70 mm deep (front to back). In a preferred embodiment, the band is about 55-65 mm deep. It is understood that these dimensions are provided by way of example only. The lens 950 can have other dimensions that provide a different illumination pattern.

In this embodiment, the lens 950 can be manufactured from BK7 glass, having a refractive index of 1.5168, and a focal length of 12.7 mm. It is understood that different materials having different properties can also be used to generate a band having the desired dimensions. In some embodiments, a lens (not shown) can also be used on the rear laser line generator 123 to focus the laser light within the rear focus area 403.

In some embodiments, images from multiple detectors (106, 116, 120) can be fused together to form a single graphic image representation using known image fusion technology within the sensors fusion module 718 (FIG. 7). Some such image fusion technologies can be found, by way of example and not limitation, in U.S. Pat. Nos. 8,544,634, and 6,452, 637, and in patent applications WO2006/017233, WO2004/ 063878 and WO2006060043, etc.

In alternate embodiments, images from each of the line scan cameras (116a, 116b) and Ladars (106a, 106b) can be processed separately. In this embodiment, if the processed images from multiple cameras (116) or Ladars (106) indicate the presence of FOD, the alarm can be triggered. For example, if both cameras 116 and Ladars 106 indicate the presence of an object on the runway, an alarm can be generated with a very high degree of likelihood that an object is actually present if three of the four indicate the presence of an object, an alarm can be generated with a less high degree of likelihood. If only two of the four systems indicate the presence of an object, it may be less likely that an object is actually present. It is therefore possible to program the system sensitivity to generate the alarm only when there is a high degree of likelihood that an object is actually present, and to not generate an alarm when the likelihood is less.

For example, it is possible to program the system sensitivity to generate an alarm if both line scan cameras (116a, 116b) and Ladars (106a, 106b) indicate the presence of an object, while not generating an alarm if only two of the four indicate the presence of an object. It is understood that this is only one example of the system sensitivity settings available, and any combination of system settings can be used to determine whether or not to generate an alarm. Likewise, it is possible to provide more weight to the line scan cameras (116) or Ladars (106) in making this determination. All combinations and potential weightings therefore, fall within the scope of the present embodiment.

Some portions of the description provided above are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signets capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific integrated Circuit (ASIC). Numerous other possibilities exist. Those skilled in the art will appreciate that the system can also be implemented as a combination of hardware and software modules.

INDUSTRIAL APPLICATIONS

Currently, airports around the world use sweepers to remove FODs off runways. A sweeper vehicle equipped with the system described above detects a local area around the sweeper and the local area accompanies the vehicle's movement. Immediate sweeping can be carried out when an FOD is detected For an airport with two or more runways, an operational fleet of two or three such sweepers can complete sweeping duties, which reduces the cost of detecting and removing FODs as a large network of FOD cleaning robots, or expensive airport radar systems, are not required. A sweeper vehicle equipped with the system described above can also detect FODs on the post-swept areas behind the sweeper vehicle in order to verify the effectiveness of sweeping and to keep a record for analysis. This can help reduce the liability of an airport operator for any potential litigation that may arise as a result of potential FOD damage.

Multiple sweeper vehicles equipped with the system described above are able to communicate with each other or with an inspection vehicle in order to coordinate the sweeper vehicles during a sweeping operation. This frees some capacity of the inspection vehicle so that an inspection vehicle can support a larger area of sweeping with the help of auxiliary, possibly cheaper sweepers.

Vehicles equipped with the system described above can leave a normally straight course of inspection or sweeping at any time or even follow a zigzag route as long as the vehicle returns to the detour point to resume the predefined route during the sweeping operation. Hence, the vehicles are not fixed into following predefined sweeping routes during the course of their sweeping operation, but may interrupt their intended passage and follow an alternate route, while ensuring that the whole runway is covered.

Further flexibility is provided for such a sweeper with detectors onboard because it can adapt to any airports or racing tracks without prior infrastructure installation or modification. For an automatic sweeping operation to take place, the onboard computer system just needs to download a digital map of the area of interest and the sweeper can immediately plan and sweep the concerned area. A report of sweeping effectiveness can be generated to monitor areas before and after sweeping.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:
1. A foreign object detection system comprising:
a plurality of detectors mounted on a vehicle and capable of receiving light reflected from an object on a surface, and producing data that indicates the presence of said object as said vehicle moves along the surface; and
a computer electrically coupled to the plurality of detectors, said computer being capable of processing said data and generating an alarm to alert an operator of said vehicle to a presence of said object;
wherein said data comprises a velocity of said vehicle, a velocity of said plurality of detectors with respect to said object, and a distance of said object from the detection system, and wherein said processed data further comprises at least one attribute selected from a group consisting of an image of said object, a location of said object, a time that said data was collected, a material texture of said object and a size of said object.

2. The detection system of claim 1, wherein:
said plurality of light sources comprises 4 laser line generators mounted on a front of said vehicle and two xenon lights positioned on said vehicle to illuminate said monitored area;
each of said 4 laser line generators further comprises a converging lens capable of focusing laser light in a linear band perpendicular to a direction of travel of said vehicle, said band being between 50 millimeters and 70 millimeters deep focused between 10 meters and 12 meters in front of said vehicle, within said monitored area.

3. The detection system of claim 2, wherein a wavelength of the light emitted from said laser line generators is in a range of about 600 nm to about 900 nm.

4. The detection system according to claim 2, wherein said light from said laser line generators has a wavelength of 680 nm, and wherein said computer generates said alarm to indicate the presence of an aluminum object on said surface.

5. The detection system of claim 1, wherein said computer further comprises:
at least one visual display screen;
at least one speaker located within said vehicle; and
said system further comprises a global positioning system electrically coupled to said computer, said global positioning system capable of providing a position of said vehicle on said surface, and said location, to said operator, using said visual display screen;
wherein said computer uses a time-varying potential field algorithm to process said data and said processed data is used to generate at least one of an audio alarm through said speaker and a visual alarm on said display screen to indicate the presence of said object to the operator of said vehicle.

6. The detection system of claim 5, further comprising a recording system to record said processed data and a position of said vehicle, and wherein said computer further comprises:
a database containing said processed data and a digital lookup table containing information concerning particular characteristics of known or scanned articles; and
an image object detection module capable of comparing said processed data with said digital lookup table to determine the presence of said object.

7. The detection system of claim 1, wherein said plurality of detectors is selected from a group consisting of a photographic imager, a laser radar and a visible light sensor and wherein the photographic imager is selected from a group consisting of a line scan camera, a Charged-Coupled Device (CCD) camera, a Complementary Metal-Oxide Semiconductor (CMOS) camera and an infrared (IR) camera.

8. The detection system of claim 7, wherein said plurality of detectors comprises two photographic imagers and a snapshot camera mounted on said vehicle, and wherein said processed data includes a stereo image of said object.

9. The detection system of claim 8, wherein said plurality of detectors further comprises two Ladars mounted on the front of said vehicle and wherein said computer analyzes the data received from each of said detectors, and generates said alarm when at least three of said detectors indicate the presence of said object.

10. The detection system of claim 8, wherein said system further comprises a global positioning system electrically coupled to said computer, said global positioning system capable of providing a position of said vehicle on said surface, and a location of said object, to said operator, using a visual display screen, and wherein said snap-shot camera is activated by said computer when said global positioning system provides a signal to said computer indicating that said vehicle is within a stipulated distance from said object.

11. The detection system according to claim 1, wherein said surface is one of an airport runway, a highway, a railroad track, and a racetrack;
said vehicle is operated at a speed of at least 20 kilometers per hour; and
said monitored area is at least one of a first area in front of said vehicle and a second area behind said vehicle.

12. The detection system of claim 1, wherein said computer uses a time-varying potential field algorithm to process said data.

13. The detection system of claim 12, wherein said algorithm comprises a dynamic potential $U(x, y, t)$ that is given by the formula $$U(x, y, t) = \sum_{1}^{n} \left( \frac{k_1}{d_i} + \frac{k_2(\vec{V}_m + \vec{V}_i)\vec{d}_i}{d_i^2} \right)$$

wherein $V_m$ is the velocity of said vehicle, $V_i$ is the velocity of said detection system with respect to the object, $d_i$ is the distance from the object i to the detection system, n is the number of obstacles, and $k_1$ and $k_2$ are constants.

14. The detection system of claim 13, wherein said plurality of detectors comprises at least one detector mounted on each of a left side of said vehicle and a right side of said vehicle, and wherein said algorithm can be used to compute said dynamic potential for each of said left and a right detectors.

15. The detection system of claim 14, wherein said object is detected based on a comparison of said dynamic potentials for each of said left and right detectors.

16. A method of detecting a foreign object on a surface, the method comprising the steps of:
providing a system comprising a plurality of detectors mounted on a vehicle and capable of receiving light reflected from an object on the surface, and of producing data that indicates the presence of said object as said vehicle moves along the surface, and a computer electrically coupled to each of the plurality of detectors;
driving said vehicle along said surface; and
using the computer to process the data from the plurality of detectors to detect the object and to generate an alarm to indicate a presence of said object to an operator of said vehicle;
wherein said data comprises a velocity of said vehicle, a velocity of said plurality of detectors with respect to said object, and a distance of said object from the system; and
wherein said processed data further comprises at least one attribute selected from a group consisting of an image of said object, a location of said object, a time that said data was collected, a material texture of said object and a size of said object.

17. The method of claim 16, wherein said system further comprises a plurality of light sources mounted on the vehicle and capable of illuminating at least one monitored area of the surface with light, said plurality of light sources being electrically coupled to said computer, the method further comprising the step of;
illuminating the monitored area during low light conditions prior to said using step.

18. The method of claim 17, wherein the plurality of light sources comprises 4 laser line generators mounted on a front of the vehicle and at least one xenon light positioned on the vehicle to illuminate the monitored area, the plurality of detectors comprises two line scan cameras mounted on the vehicle, the computer further comprises at least one speaker and at least one display device for communicating said alarm to said driver, a recording system to record said processed data, a database containing said processed data, a digital lookup table containing information concerning particular characteristics of known or scanned articles, and an image object detection module capable of comparing said processed data with said digital lookup table to determine a presence of said object; and wherein said using step further comprises:

receiving and processing a data signal from each of the line scan cameras;

comparing the processed data with the digital lookup table using the image object detection module to determine the presence of the object; and generating said alarm using at least one of said speaker and said display device.

19. The method of claim 18, wherein each of the 4 laser line generators further comprises a converging lens capable of focusing laser light in the monitored area; and wherein said illuminating step further comprises focusing the laser light in a linear band perpendicular to a direction of travel of the vehicle, the band being between 50 millimeters and 70 millimeters deep focused between 10 meters and 12 meters in front of the vehicle, within the monitored area.

20. The method of claim 18, wherein the system further comprises a transmitter to transmit the alarm to a location remote from the vehicle, the light from the laser line generators has a wavelength of 680 nm, said comparing step further comprises determining if the object comprises aluminium, and wherein said generating step further comprises sending the alarm to the remote location.

21. The method of claim 16, wherein said computer uses a time-varying potential field algorithm to process said data.

22. The method of claim 21, wherein said algorithm comprises a dynamic potential $U(x, y, t)$ that is given by the formula $$U(x, y, t) = \sum_{1}^{n} \left( \frac{k_1}{d_i} + \frac{k_2(\vec{V}_m + \vec{V}_i)\vec{d}_i}{d_i^2} \right)$$

wherein $V_m$ is the velocity of said vehicle, $V_i$ is the velocity of said detection system with respect to the object, $d_i$ is the distance from the object i to the detection system, n is the number of obstacles, and $k_1$ and $k_2$ are constants.

23. The method of claim 22, wherein said plurality of detectors comprises at least one detector mounted on a left side of said vehicle and a right side of said vehicle, and wherein said algorithm can be used to compute said dynamic potential for each of said left and a right detectors.

24. The method of claim 23, wherein said object is detected based on a comparison of said dynamic potentials for each of said left and right detectors.

25. The detection system of claim 1, further comprising a plurality of light sources mounted on the vehicle and capable of illuminating at least one monitored area of the surface with light, said plurality of light sources capable of being electrically coupled to said computer.

26. The detection system according to claim 25, wherein said plurality of light sources further comprises a laser line generator mounted on a rear of the vehicle and at least one xenon light mounted on the rear of the vehicle, said plurality of detectors further comprises a line scan camera mounted on the rear of the vehicle and a video camera mounted on the rear of the vehicle, and wherein said computer generates said alarm if the vehicle passes said object.

27. The method of claim 19, wherein the detectors further comprise two Ladars mounted on the front of the vehicle, and wherein said using step further comprises generating the alarm if the object is detected by at least three of the detectors.

* * * * *